Figure 1:
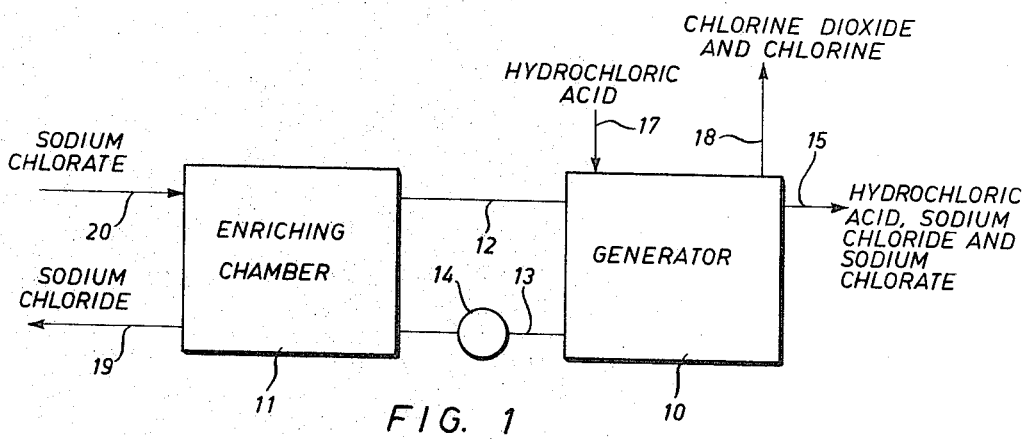

Sept. 12, 1967     H. C. SCRIBNER     3,341,287

PROCESS FOR THE PRODUCTION OF CHLORINE DIOXIDE

Filed Oct. 11, 1963

HERBERT CHARLES SCRIBNER
INVENTOR.

BY

Attorney

United States Patent Office 3,341,287
Patented Sept. 12, 1967

3,341,287
PROCESS FOR THE PRODUCTION OF CHLORINE DIOXIDE
Herbert C. Scribner, Scarborough, Ontario, Canada, assignor to Electric Reduction Company of Canada, Ltd., Toronto, Ontario, Canada
Filed Oct. 11, 1963, Ser. No. 315,456
8 Claims. (Cl. 23—152)

This invention relates to a new and improved process for the production of chlorine dioxide. More particularly, this invention relates to a novel and useful process for continuously and rapidly producing chlorine dioxide with high yields.

Chlorine dioxide has been prepared from sodium chlorate in acid solution by a variety of methods, the efficiency of which are dependent on the following reactions:

(1)  $2NaClO_3 + 4HCl \rightleftharpoons 2ClO_2 + Cl_2 + 2NaCl + 2H_2O$ (2)  $NaClO_3 + 6HCl \rightleftharpoons 3Cl_2 + NaCl + 3H_2O$ Ordinarily reaction (2) predominates over reaction (1) whenever the concentration of chloride is high with respect to the concentration of chlorate, and this results in a low yield of chlorine dioxide.

To minimize reaction (2) it has been the practice to carefully proportion the mixture of chlorates, chlorides and inorganic acid. In practice this requires the close control of the addition rates of chlorates, chloride and acid. Furthermore, where sulphuric acid is the acid which is used, it has been found that the quantity of acid required is high, making the process expensive, where additional use cannot be made of the acid.

An alternative method that has been suggested is to couple the chlorine dioxide producing plant with an electrolytic chlorate plant, and thus to convert the metal chloride to chlorate in order to maintain the desired ratio of chlorate to chloride in the reaction. This method unfortunately requires the building of an expensive electrolytic chlorate producing plant, which is most uneconomical unless the quantities of chlorine dioxide required are very large. Furthermore, the control of an electrolytic chlorate plant is relatively complex.

Yet another method that has been suggested is to operate a reactor at a sufficiently low temperature (below +10° C.) that precipitation of sodium chloride from the reactor occurs. The sodium chloride so precipitated is separated, effluent from the reactor is treated to desorb chlorine dioxide and chlorine therefrom, and the residual solutions are used in the preparation of a new solution of sodium chlorate for the subsequent manufacture of chlorine dioxide. This method suffers from the disadvantage that expensive cooling equipment is required. Furthermore, the use of such cooling equipment adds to the operating cost of the process. In addition, since the solubility of chlorine dioxide and chlorine decreases with temperature, it is more difficult to desorb these gases at lower temperatures. For this reason in the aforementioned process the reaction mixture is passed from the reactor to a heated desorber which represents an additional capital expense. Finally, this process suffers from the disadvantage that to precipitate sodium chloride from the reactor requires the provision of a more mechanically complex reactor than would otherwise be required.

Accordingly, it is an object of this invention to provide a new and improved process capable of producing chlorine dioxide simply, efficiently, continuously and inexpensively.

In brief, a process embodying this invention comprises reacting an aqueous solution of an alkali metal chlorate with hydrochloric acid in a reaction zone to produce chlorine dioxide. At least a portion of the solution in the reaction zone is passed to an enriching zone which contains a bed of a solid alkali metal chlorate, there being present in the enriching zone an excess of the solid alkali metal chlorate beyond the amount necessary to saturate the solution from the reaction zone with respect to alkali metal chloride which is dissolved in this solution, whereby conditions favourable to the precipitation of the alkali metal chloride are established in the enriching zone. The chlorate content of the solution is enriched, and alkali metal chloride is precipitated in the enriching zone by passing of the solution through the enriching zone. The enriched solution subsequently is returned to the reaction zone for reaction with hydrochloric acid to produce chlorine dioxide.

Figure 2:
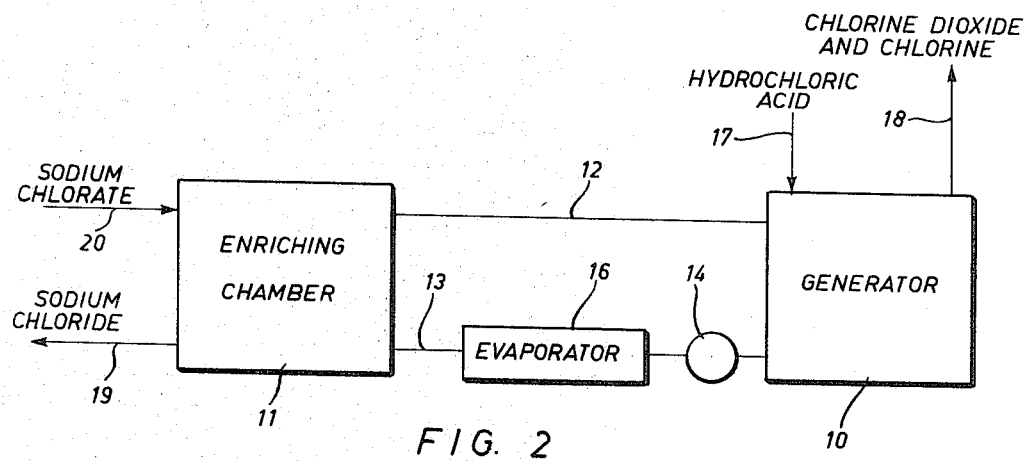

This invention will become more apparent from the following detailed description taken in conjunction with the appended drawings, in which:

FIGURES 1 and 2 are flow sheets schematically illustrating two embodiments of this invention.

Referring to FIGURE 1, there is shown a chlorine dioxide generator 10 and an enriching chamber 11, these components being connected by pipes 12 and 13, the latter of which has a pump 14 therein. Generator 10 is provided with an overflow pipe 15.

FIGURE 2 is similar to FIGURE 1 except that overflow pipe 15 of generator 10 in FIGURE 1 has been omitted, and an evaporator 16 is provided in pipe 13.

Referring again to FIGURE 1, hydrochloric acid in gaseous form or in aqueous solution is added to generator 10 at 17 and reacts with sodium chlorate in aqueous solution in generator 10 to produce chlorine dioxide, chlorine and sodium chloride. The chlorine dioxide so produced is withdrawn from generator 10 at 18 by bubbling an inert (with respect to chlorine dioxide) gas such as air or chlorine through the solution in generator 10. The chlorine dioxide and inert gas then may be separated in well known gas separation devices in accordance with conventional procedures. The operating conditions of generator 10 are such that the sodium chloride remains in solution and is not precipitated in generator 10.

A part of the solution in generator 10 is pumped by pump 14 through pipe 13 to enriching chamber 11 which contains a bed of solid sodium chlorate. An excess of sodium chlorate sufficient to saturate the effluent from generator 10 with respect to sodium chloride is maintained in enriching chamber 11. The chlorate content of the solution is enriched by passing the solution through enriching chamber 11. At the same time, due to the difference in solubilities of sodium chloride and sodium chlorate, sodium chloride is precipitated in enriching chamber 11 and is withdrawn at 19. This sodium chloride may be returned to an electrolytic process for conversion to chlorate. Sodium chlorate in solid form is added to enriching chamber 11 at 20.

The enriched solution is returned to generator 10 via pipe 12 for reaction with hydrochloric acid to produce chlorine dioxide.

Overflow pipe 15 permits the withdrawal of an amount of the solution in generator 10 equivalent to the volume of the reactants fed to generator 10. The overflow from generator 10 is an aqueous solution of hydrochloric acid, sodium chloride and sodium chlorate which may be returned to an electrolytic process for conversion to sodium chlorate.

For best efficiency it is desirable that the molar ratio of $ClO_3^-/Cl^-$ in generator 10 be maintained at a value greater than one.

The process carried out in the apparatus of FIGURE 2 is essentially the same as the process hereinbefore described, with the exception that there is no overflow from generator 10, and an amount of water equivalent to the water formed by and added with the reactants is removed from the solution passing from generator 10 to enriching chamber 11 by evaporator 16.

It will be appreciated, of course, that any alkali metal chlorate may be used in the practice of this invention, not only sodium chlorate.

To illustrate the manner in which this new process may be carried out, and the results obtainable therefrom, the following examples are referred to:

*Example 1*

37% hydrochloric acid was added to generator 10 while the reaction solution was circulated through a bed of sodium chlorate in enriching chamber 11 at a rate such that the solution leaving generator 10 via pipe 13 contained 394 grams per litre of sodium chlorate, 151 grams per litre of sodium chloride, and 19 grams per litre of hydrogen chloride, and the solution returning to generator 10 via pipe 12 contained 532.5 grams per litre of sodium chlorate, 123 grams per litre of sodium chloride and 14.6 grams per litre of hydrogen chloride. The generator 10 and enriching chamber 11 were maintained at 40±5° C., and a current of air was passed though the generator solution to carry off the chlorine dioxide produced. The efficiency of the conversion of the chlorate to chlorine dioxide was 92.3%.

Further examples of processes carried out in the same manner as the process outlined in Example 1 are tabulated below:

| No. | Leaving Generator | | | | Returning to Generator | | | Efficiency |
|---|---|---|---|---|---|---|---|---|
| | Chlorate, gm./l. | Chloride, gm./l. | HCl, gm./l. | $ClO_3^-/Cl^-$ | Chlorate, gm./l. | Chloride, gm./l. | HCl, gm./l. | |
| 2 | 447 | 168 | 17 | 1.46 | 500 | 155 | 16.5 | 92.4 |
| 3 | 390 | 181 | 18.5 | 1.18 | 530 | 146 | 14.2 | 92.3 |
| 4 | 314 | 202 | 21.5 | 0.85 | 555 | 139 | 13.1 | 85.5 |

Those skilled in the art will appreciate that while there have been described preferred embodiments of this invention, changes may be made therein without departing from the spirit and scope of this invention as defined in the appended claims. For example, while it is preferred to carry out processes embodying this invention on a continuous basis, such processes are capable of being carried out as batch operations.

What I claim as my invention is:

1. In a process for the production of chlorine dioxide of a type in which an aqueous solution of an alkali metal chlorate is reacted with hydrochloric acid in a reaction zone to produce chlorine dioxide and an alkali metal chloride, at least a portion of the solution in said reaction zone is passed to an enriching zone to increase the chlorate content of the last-mentioned solution and then conducted after enrichment to said reaction zone for reaction with hydrochloric acid to generate chlorine dioxide; the improvement characterized by providing in said enriching zone alkali metal chlorate in an amount in excess of the amount of chlorate required to saturate said last-mentioned solution with respect to said alkali metal chloride, whereby conditions favourable to the precipitation of said alkali metal chloride are established in said enriching zone, and increasing the chlorate content of said last-mentioned solution and precipitating said alkali metal chloride therefrom in said enriching zone by passing said last-mentioned solution through said enriching zone.

2. A process according to claim 1 in which said alkali metal chlorate is sodium chlorate and in which said alkali metal chloride is sodium chloride.

3. A process according to claim 2 in which the molar ratio of $ClO_3^-/Cl^-$ in said reaction zone is maintained at a value greater than one.

4. In a continuous process for the production of chlorine dioxide of a type in which an aqueous solution of an alkali metal chlorate is reacted with hydrochloric acid in a reaction zone to produce chlorine dioxide and an alkali metal chloride, hydrochloric acid is added to said reaction zone, chlorine dioxide is withdrawn from said reaction zone, at least a portion of the solution in said reaction zone is passed to an enriching zone to increase the chlorate content of the last-mentioned solution and then conducted after enrichment to said reaction zone for reaction with hydrochloric acid to generate chlorine dioxide; the improvement characterized by adding to said enriching zone sufficient alkali metal chlorate to maintain an amount of chlorate in said enriching zone in excess of the amount of chlorate required to maintain said last-mentioned solution saturated with respect to said alkali metal chloride, whereby conditions favourable to the precipitation of said alkali metal chloride are maintained in said enriching zone, increasing the chlorate content of said last-mentioned solution and precipitating said alkali metal chloride therefrom in said enriching zone by passing said last-mentioned solution through said enriching zone, and removing precipitated alkali metal chloride from said enriching zone.

5. A process according to claim 4 in which said alkali metal chlorate is sodium chlorate and in which said alkali metal chloride is sodium chloride.

6. A process according to claim 5 including the step of evaporating water from said last-mentioned solution prior to passing said last-mentioned solution through said enriching zone.

7. A process according to claim 4 including the step of evaporating water from said last-mentioned solution prior to passing said last-mentioned solution through said enriching zone.

8. A process according to claim 6 in which the molar ratio of $ClO_3^-/Cl^-$ in said reaction zone is maintained at a value greater than one.

References Cited

UNITED STATES PATENTS

| 2,280,938 | 4/1942 | Vincent | 23—152 X |
| 2,484,402 | 10/1949 | Day et al. | 23—152 |
| 2,585,593 | 2/1952 | Sevon et al. | 23—152 |
| 2,861,871 | 11/1958 | Germano | 23—152 |
| 2,936,219 | 5/1960 | Rapson | 23—152 |

FOREIGN PATENTS

| 465,168 | 5/1950 | Canada. |
| 674,808 | 7/1952 | Great Britain. |

OSCAR R. VERTZ, *Primary Examiner.*

EDWARD STERN, *Examiner.*